(12) United States Patent　　(10) Patent No.: US 8,159,178 B2
Serban　　(45) Date of Patent: Apr. 17, 2012

(54) AC CONNECTED MODULES WITH LINE FREQUENCY OR VOLTAGE VARIATION PATTERN FOR ENERGY CONTROL

(75) Inventor: Emanuel Serban, New Westminster (CA)

(73) Assignee: Xantrex Technology Inc., Livermore, CA (US)

( * ) Notice: Subject to any disclaimer, the term of this patent is extended or adjusted under 35 U.S.C. 154(b) by 432 days.

(21) Appl. No.: 12/545,234

(22) Filed: Aug. 21, 2009

(65) Prior Publication Data

US 2011/0043160 A1　　Feb. 24, 2011

(51) Int. Cl.
*H01M 10/44*　　(2006.01)
*H02J 7/04*　　(2006.01)

(52) U.S. Cl. ........ 320/101; 320/138; 320/139; 320/162; 323/906

(58) Field of Classification Search ............. 320/101
See application file for complete search history.

(56) References Cited

U.S. PATENT DOCUMENTS

| | | | | |
|---|---|---|---|---|
| 4,560,916 A | * | 12/1985 | Yoshiyuki et al. | ............... 322/86 |
| 2007/0040540 A1 | | 2/2007 | Cutler | |
| 2007/0246943 A1 | * | 10/2007 | Chang et al. | ..................... 290/44 |
| 2008/0106921 A1 | | 5/2008 | Dickerson et al. | |
| 2008/0151583 A1 | * | 6/2008 | Matsumoto | ...................... 363/34 |
| 2008/0290252 A1 | | 11/2008 | Leonhardt et al. | |
| 2009/0103340 A1 | | 4/2009 | Bremicker et al. | |
| 2009/0180262 A1 | | 7/2009 | Knopf et al. | |

OTHER PUBLICATIONS

Solartechnology Sunny Island 4248U, Battery Inverter/Charger for Stand-Alone and Back-up Applications Installation & Operating Instructions; Dated 2004 (100 pages).

New V/f-Statics controlled Battery Inverter: Sunny Island®—the key component for AC-Coupled Hybrid Systems and Mini Grids, Mike Meinhardt, Martin Rothert, Alfred Engler; (downloaded Dec. 1, 2009); (6 pages).

Oasis Montana Batteryless Grid-Tie Electric Power Systems, Just what is a Grid-tied PV System? Oasis Montana Inc., http://www.grid-tie.com/ (downloaded Aug. 6, 2009); (3 pages).

The Solar Guide, Grid-Tie Inverters (Synchronous Inverters) http://www.thesolarguide.com/solar-energy-systems/grid-tie-inverters.aspx (downloaded Aug. 6, 2009); (1 page).

Oasis Montana Xantrex XW Series Power Inverters, Oasis Montana Inc., http://www.oasismontana.com/Xantrex-xw-inverter.html (downloaded Aug. 6, 2009); (4 pages).

(Continued)

*Primary Examiner* — Patrick Assouad
*Assistant Examiner* — Nathaniel Pelton
(74) *Attorney, Agent, or Firm* — Nixon Peabody LLP

(57) ABSTRACT

A control strategy for distributed power generation modules in a power system that varies the line frequency or voltage according to a predetermined pattern to cause a PV inverter to modify its power output and thereby avoid overcharging a battery. When the power system operates in islanded mode, the AC load demand can be lower than the available energy from the PV array, causing the battery to become overcharged. To avoid this scenario, a hybrid inverter executes a pattern generator algorithm that varies the line frequency or voltage linearly, exponentially or any mathematical function or look-up tables. The PV inverter executes a pattern detection algorithm that detects the linear, exponential, or any mathematical function or look-up table change in the line frequency. In response, the PV inverter modifies its power output until an overcharging condition of the battery is removed. The line frequency/voltage can be varied within the anti-islanding limits.

19 Claims, 6 Drawing Sheets

OTHER PUBLICATIONS

Each PV system is unique, SMA has the right solution for every application http://www.sma-america.com/en US/products/overview.html (downloaded 8/6/9); (2 pages).

Written Opinion corresponding to International Patent Application No. PCT/EP2010/045151, European Patent Office, dated Dec. 20, 2010, 6 pages.

International Search Report corresponding to International Patent Application No. PCT/EP2010/045151, European Patent Office, dated Dec. 20, 2010, 4 pages.

Thomas Degner et al.: "Interconnection of Solar Powered Mini-Grids—A Case Study for Kythnos Island" XP040511137; dated 2004; (4 pages).

Gules R. et al.: "A Maximum Power Point Tracking System With Parallel Connection for PV Stand-Alone Applications" XP011226625; dated 2008; (10 pages).

Armenta-Deu C.: "Prediction of Battery Behaviour in SAPV applications" XP004417242; dated 2003; (14 pages).

* cited by examiner

AC CONNECTED MODULES WITH LINE FREQUENCY OR VOLTAGE VARIATION PATTERN FOR ENERGY CONTROL

FIELD OF THE INVENTION

This invention relates generally to apparatuses and methods for controlling the energy supplied to a battery via AC-connected modules with predetermined line-frequency or voltage variation pattern generation and detection.

BACKGROUND

In a distributed power system in which energy is distributed by electrical distribution gear, controlled by distributed power generation modules, and stored in energy storage elements, excess energy can be present in the power system, which can damage electrical devices, particularly batteries. One solution to avoid the harmful effects of excess energy build-up in a power system is to provide wired communication among the control devices to prevent or minimize the excess energy. This solution prevents control devices from being placed far apart from one another, and requires additional control wiring to be installed among the various control devices. Another solution is to dump the excess energy into resistive loads, but this is obviously wasteful and an inefficient allocation of energy.

What is needed, therefore, is a solution that does not require the use of wires among the control devices in a power system for preventing excess energy or resistive loads for wastefully absorbing excess energy.

BRIEF SUMMARY

The power converter system integration with renewable energy sources and interaction within a microgrid structure is presented with applicability in off-grid islanded, grid-connected and genset-connected for residential and commercial installations. The system architecture incorporates distributed power generation (DPG) modules with flexible modes of operation to control the power flow for energy prioritization and system efficiency maximization. Different energy sources are integrated within the microgrid system for stable and robust DPG control operation under transients and dynamic conditions at the DC and AC ports of the hybrid converter. The control structure is implemented at the device level, and there is no need for protocol communication interfaces between the hybrid converter and PV inverter. In off-grid islanded mode when the energy provided by the PV inverter flows into the bi-directional hybrid converter the DC battery voltage or current can reach unacceptable levels. A control method implemented within the hybrid converter uses a pattern generation algorithm that varies the line frequency with a specific frequency change rate related to the DC change rate or that varies the line voltage. The PV inverter ceases to convert power until the AC line frequency limits are restored to the normal range as the battery DC level falls back within the specified set point limits. The agent of communication is the AC line frequency or voltage, which is precisely controlled by the hybrid converter. Furthermore, the PV inverter control is enhanced with the implementation of a pattern detection algorithm that continuously monitors the microgrid line frequency or voltage and reduces its power if a specific pattern is detected while the hybrid converter varies the line frequency or voltage determined by the desired charging profile. The proposed control method can be applied to single, three-, or poly-phase AC systems.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
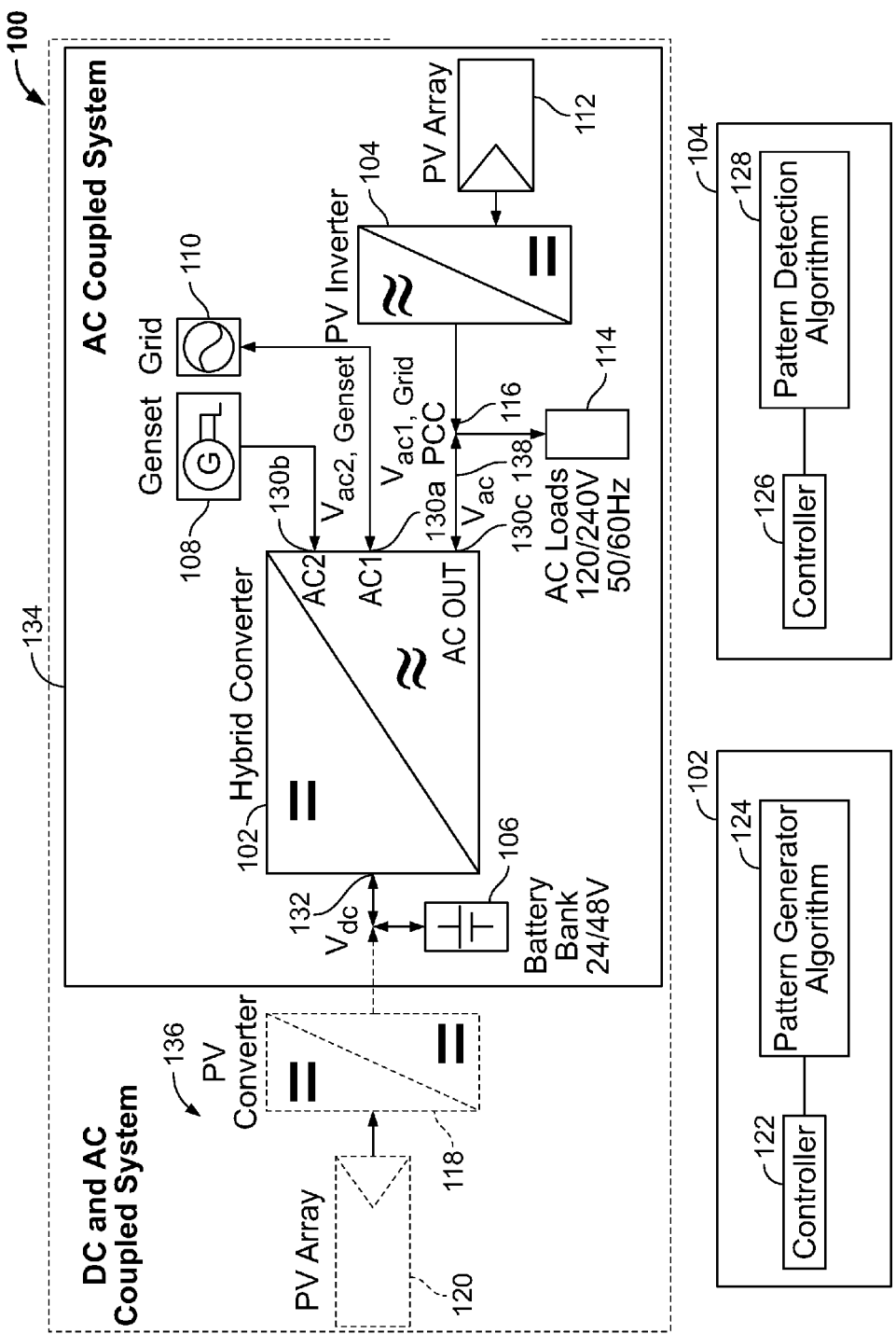
FIG. 1 is a functional block diagram of a power system according to an aspect of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a functional block diagram of a power system 100 (also referred to as a microgrid) that includes distributed power generation (DPG) modules, distributed energy storage elements, electrical distribution gear, and controllable loads 114. The power system 100 includes an AC coupled system 134 and an optional DC coupled system 136. The power system 100 includes an alternating current (AC) coupled system having a first module or a hybrid converter 102 that is coupled to a second module or a photovoltaic (PV) inverter 104 through a point of common coupling (PCC) 116. The first module 102 is also coupled to a battery 106, such as a battery bank. The first module 102 automatically changes a characteristic (e.g., frequency or voltage) of an alternating current (AC) line, $V_{ac}$, using a pattern generator algorithm 124 that produces a modified output at a first AC output 130c that varies the characteristic (e.g., frequency or voltage) of the AC line according to a first predetermined pattern that is produced by a first function. The first module 102 includes a first controller 122 programmed with machine-readable instructions for carrying out the generator pattern algorithm 124 and is electrically coupled to the battery 106 and to at least one source of AC energy 108, 110. In the illustrated example, the AC energy source can be a distributed generator system (genset) 108 or a utility grid 110.

The first module 102 is shown as having two AC inputs, a first AC input 130a for receiving energy from the utility grid 110 and a second AC input 130b for receiving energy from the genset 108. Alternately, the first module 102 can have only one AC input or more than two AC inputs. The first module 102 determines whether a monitored current or voltage of the battery 106 satisfies a predetermined criterion. The first module 102 can include a hybrid converter for providing and receiving direct current (DC) or AC energy or both AC and DC energy to or from the distributed elements 106, 114, 104, 108, 110, 118 coupled to the first module 102. A suitable hybrid converter includes a 6 kVA XW6048 converter module by Xantrex Technology, Inc.

The power system 100 can be placed into any one of three configurations or modes. In islanded mode, the utility grid 110 is disconnected. In grid-connected mode, the utility grid 110 is connected. In genset-connected mode, the genset 108 (e.g., via diesel or propane generators) is connected.

The second module 104 is electrically coupled to and remote from the first module 102 and detects, via a pattern detection algorithm 128, the modified output produced by the first module 102, and, in response to that detection, causes the current or voltage applied to the battery 106 for charging the battery 106 to be changed via the first module 102. The second module 104 includes a second controller 126 programmed with machine-readable instructions for carrying out the pattern detection algorithm 128.

The second module 104, 118 is coupled to a renewable energy conversion unit 112, 120 that converts a source of renewable energy into electricity. The renewable energy conversion unit 112, 120 can include, for example, a photovoltaic (PV) array coupled to the photovoltaic (PV) inverter or converter 104, 118 and outputs a corresponding current (DC current in the case of the photovoltaic converter 118, and an AC current in the case of a photovoltaic inverter 104).

The first module 102 can be a four-quadrant pulse width modulated (PWM) bidirectional energy converter (hybrid converter) with integrated AC transfer switches and three modes of operation. Hybrid converters interface DC energy sources, such as PV generators, wind turbines, fuel cells, and AC energy sources, such as the utility grid 110 and a genset 108, at both AC and DC ports 130a-c, 132. In a first mode, the hybrid converter 102 operates as a voltage-controlled source converter, in which the hybrid converter 102 converts DC to AC energy for inverter mode islanded back-up power to meet power quality requirements. In this mode, the hybrid converter 102 controls the AC voltage and frequency within the power system (or microgrid) 100. In a second mode, the hybrid converter 102 operates as a current-controlled source converter, in which the hybrid converter 102 converts DC to AC energy when the AC source 110, 108 is connected (grid-connected or genset-connected mode). The genset 108 or the utility grid 110 generates the AC voltage and frequency. This current-controlled source mode is used primarily when renewable energy (such as solar, wind, rain, tides, micro hydropower, or geothermal heat) generated from natural resources is exported from a DC port 132 of the hybrid converter 102 to the microgrid AC network. In FIG. 1, an optional PV solar array 120 is connected to the battery 106 via an optional PWM DC/DC PV converter 118. In a third mode, the hybrid converter 102 operates in an active rectifier mode with optional power factor correction (PFC). In the active rectifier mode, the hybrid converter 102 converts AC to DC energy and regulates the DC voltage or current to the battery 106 within prescribed limits, such as in accordance with a conventional battery charge algorithm that determines a charging profile (e.g., bulk, absorption, or float stages) for the battery 106 (e.g., 24/48V). The PV converter 118 regulates the DC battery voltage or current based on the amount of PV power generation or the state of the battery charge.

The PV inverter 104 and the PV converter 118 are preferably PWM converters with corresponding embedded maximum power point tracker (MPPT) algorithms at the DC input to harvest the maximum energy from the respective PV arrays 112, 120. MPPT algorithms are well known to those of ordinary skill in the art to which this disclosure pertains. The MPPT algorithm in the second modules 104, 118 is preferably optimized to balance fast energy harvesting versus control stability and sweeping the I-V curve to find the global maxima. The PV inverter 104 operates in current-controlled mode, converting DC to AC energy and controlling the AC current in magnitude and phase. The PV inverter 104 is preferably transformerless due to its higher efficiency and smaller size and weight. The PV converter 118 operates in MPPT mode while maintaining the desired multi-stage charging profile (bulk, absorption, and float).

When the power system 100 is in grid-connected mode, the available energy from the battery 106 is transferred to the AC loads 114 or back to the utility grid 110 through the bidirectional hybrid converter 102, which operates in current-controlled source mode. If the utility grid 110 is in a fault condition, the hybrid converter 102 transfers the power system 100 into islanded mode. A conventional indirect current algorithm can be implemented in the hybrid converter 102 for a seamless transfer of power when the utility grid 110 fails.

The AC coupled system 134 shown in FIG. 1 is configured with the PV array 112 connected at the PCC 116 through the PV inverter 104 for maximizing energy conversion efficiency. When the utility grid 110 is present, the hybrid converter 102 transfers the power system 100 into grid-connected mode. The AC loads 114 can be powered by both the PV inverter 104 and the utility grid 110 in grid-connected mode. The hybrid converter 102 operates in active rectifier mode, charging the battery 106 so as not to exceed the grid current capacity. If the utility grid 110 fails, the power system 100 is transferred into islanded mode, and the hybrid converter 102 operates in voltage-controlled mode. If the AC load 114 demand exceeds the available energy from the PV inverter 104 and the battery 106, the genset 108 is automatically started.

In genset-connected mode, the PV inverter 104 can undesirably backfeed the genset 108. The hybrid converter 102 continuously monitors the AC current to all ports 130a-c and has integrated transfer switches on both AC ports 130a,b, AC1 and AC2, to allow disconnection of the genset 108 via the AC2 port 130b. If the load demand from the AC loads 114 exceeds the power output capability of the genset 108 and the PV inverter 104, the hybrid converter 102 enters a genset-support mode as a current-controlled source by converting the energy from the DC port 132 to the AC port 130c. If both the utility grid 110 and the genset 108 are unavailable as sources of energy for the AC loads 114, then the available sources of energy consist of the PV array 112 and the battery 106. The AC line 138 connected to the AC port 130c of the hybrid converter 102 conventionally operates for a single phase system at 120V/240 or 230V or for a three-phase system at 120V or 230V at a rated fundamental or nominal frequency of 50 Hz or 60 Hz.

Excess energy present in the power system 100 can damage the electrical devices, particularly the battery 106. Overcharging the battery 106 can undesirably cause gassing, water loss, and/or plate grid corrosion, and can shorten its lifespan. When the power system 100 is in islanded mode, the hybrid converter 102 operates in voltage-controlled source mode and controls the AC voltage and frequency on the AC line 138. The PV inverter 104 harvests the DC solar energy from the PV array 112 and operates in AC current-controlled mode. Energy for the AC loads 114 can be sourced by either or both of the PV array 112 and the battery 106. If the solar energy is greater than the load demand by the loads 114, the surplus of power will flow from the PCC 116 through the hybrid converter 102, eventually overcharging the battery 106.

The proposed pattern generator algorithm 124 maintains a constant microgrid AC line frequency and voltage magnitude (e.g., +/−0.2 Hz and +/−0.5% of nominal voltage) on the AC line 138 under normal conditions up to the point of overcharging the battery 106. The line frequency or voltage variation can be used as interaction parameters between the hybrid converter 102 and the PV inverter 104. For instance, in islanded mode when the PV inverter 104 produces greater energy than the load demand, the active power-flows to the battery 106 and the DC voltage or current of the battery 106 can exceed acceptable requirements. The hybrid converter 102 proactively monitors and applies the correct battery charging profile: if the DC voltage or current of the battery 106 exceeds the battery charging limit requirements, then the hybrid converter 102 changes the microgrid line frequency according to a predetermined pattern. The PV inverter 104 may disconnect because the AC line 138 frequency would exceed its frequency range limits or may reduce its current produced from the PV array 112 if a specific control is implemented by monitoring the AC line frequency, the agent of communication control. It is emphasized that varying the AC voltage magnitude can be used instead as an agent of communication to prevent battery overcharging. However using AC voltage magnitude is less accurate than using AC frequency because voltage drop is a function of the power wiring characteristics.

The frequency on the AC line 138 is varied in a predetermined way as a means for communicating between the hybrid converter 102 and the PV inverter 104. No additional wiring is needed for communication, and the modules 102, 104 can be positioned far away from each other: the hybrid converter 102 with the battery 106 at one location and the PV inverter 104 with the PV array 112 at a different remote location.

When the power system 100 is in islanded mode, the hybrid converter 102 controls the AC line 138 frequency and voltage regulation. When the PV inverter 104 produces greater energy than the load demand from the loads 114, the active power flows to the battery 106. The hybrid converter 102 operates in two modes at the same time: inverter mode with AC voltage/frequency regulation and active rectifier mode to charge the battery 106. The pattern generator algorithm 124 becomes active when the following two conditions are satisfied: (1) active power flows from the AC port 130c to the DC port 132; and (2) DC voltage (e.g. absorption, float) or DC current charge level of the battery 106 exceeds a certain set point limit.

Figure 2:
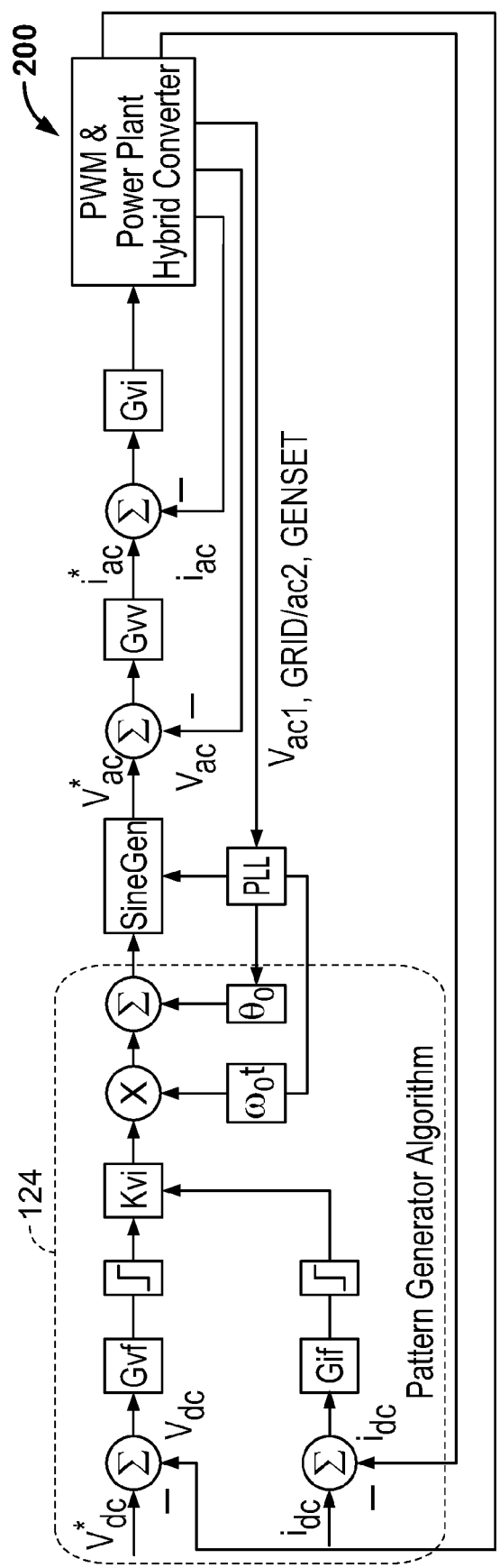
FIG. 2 is a functional block diagram of a control algorithm that includes a pattern generator algorithm executed by a controller of the hybrid controller shown in FIG. 1.

The pattern generator algorithm 124 controls the frequency of the AC line 138 by decreasing or increasing from its nominal value $f_0$=50/60 Hz according to a predetermined pattern. The pattern generator algorithm 124 can have a linear or exponential or linear-exponential response as described in more detail below. The pattern generator algorithm can be realized to output any other mathematical function or a predetermined look-up table. FIG. 2 illustrates a functional block diagram of a control algorithm 200, including the pattern generator algorithm 124, for the hybrid converter 102, which operates in voltage-controlled source inverter mode. The PCC 116 AC network voltage $V_{ac}$ is compared with the reference voltage $v^*_{ac}$ and the error is compensated by the voltage controller Gvv whose output becomes the AC current reference $i^*_{ac}$; the difference between $i^*_{ac}$ and the inductor AC current $i_{ac}$ is compensated by the current controller Gvi, which generates the duty cycle command. The hybrid converter 102 output voltage $V_{ac}$ in voltage-controlled inverter source mode is represented by two terms: the first term multiplied with the AC sinewave voltage reference $v^*_{ac}$ is desired to be close to unity for output voltage reference tracking, while the second term multiplied with the AC output current $i_0$ is desired to be close to zero for load disturbance decoupling:

$$v_{ac}(s) = \frac{G_{vv}(s) \cdot G_{vi}(s)}{s^2LC + s \cdot C \cdot G_{vi}(s)] + G_{vv}(s)G_{vi}(s)} v^*_{ac}(s) - \frac{sL + G_i(s)}{s^2LC + s \cdot C \cdot G_{vi}(s) + G_{vv}(s)G_{vi}(s)} i_0(s) \quad \text{(Function 1)}$$

where LC represents the output filter and the Laplace operator s is approximated with jω, angular frequency ω. The sinewave voltage tracking and dynamic load disturbances decoupling control implementation has to be robust and stable because the PV inverter 104 anti-islanding control actively tends to destabilize the voltage and frequency regulation in islanded mode. If the sense of the real power flow changes, i.e. the hybrid converter 102 sinks current and the DC battery 106 voltage or current reaches $V^*_{dc}/I^*_{dc}$ maximum prescribed values, then the output of pattern generator algorithm 124 $K_{VI}$ linearly (in this example) decreases the reference frequency $f_0$. A proportional-integral (PI) compensator is digitally implemented to provide both a DC voltage and current battery controller with proportional $k_p$ and integral $k_1$ gains, respectively, and a selector function, Kvi. The sinewave reference $v^*_{ac}(t)$ is generated by a look-up table with the modulating index m, amplitude scale reference $V_M$, and phase angle $\theta_0$:

$$v^*_{ac}(t) = m \cdot V_m \sin[2\pi(f_0 - |K_{vi}(t)|) \cdot t + \theta_0] \quad \text{(Function 2)}$$

In this example the frequency $f_0(t)$ would decrease from its nominal value if the monitored DC voltage and current of the battery 106 exceeds the maximum prescribed values ($V^*_{dc}/I^*_{dc}$); conversely the control algorithm 200 can accommodate an increase of frequency if desired. The selector function Kvi is given by:

$$K_{vi}(t) = \min\{K_v(t), K_i(t)\} \quad \text{(Function 3)}$$

The clamped output of the DC voltage and current battery controller is represented by the Functions (4) and (5):

$$K_v(t) = \begin{cases} x_v(t), & x_v(t) < 0 \\ 0, & x_v(t) \geq 0 \end{cases} \quad \text{(Function 4)}$$

$$K_i(t) = \begin{cases} x_i(t), & x_i(t) < 0 \\ 0, & x_i(t) \geq 0 \end{cases} \quad \text{(Function 5)}$$

The output of the DC voltage or current battery controller is represented by the relation (6):

$$x_v(t)=k_{Pv} \cdot e_v(t)+\int k_{Iv} \cdot e_v(t)dt$$

$$x_i(t)=k_{Pi} \cdot e_i(t)+\int k_{Ii} \cdot e_i(t)dt \quad \text{(Function 6)}$$

The DC voltage reference $V^*_{dc}$ represents the bulk, absorption or float voltage level that can be adjusted based on the battery type. The DC voltage reference value is also temperature-compensated as a function of the battery chemistry to achieve an optimized charge profile (e.g. −0.108V/° C. for a 48V lead-acid flooded battery). The DC current reference $I^*_{dc}$ represents the maximum current limit acceptable to the battery 106. The difference between the reference and the instantaneous value represents the error value applied to the PI compensator:

$$e_v(t)=V^*_{dc}-v_{dc}(t)$$

$$e_i(t)=I^*_{dc}-i_{dc}(t) \quad \text{(Function 7)}$$

Figure 3A:
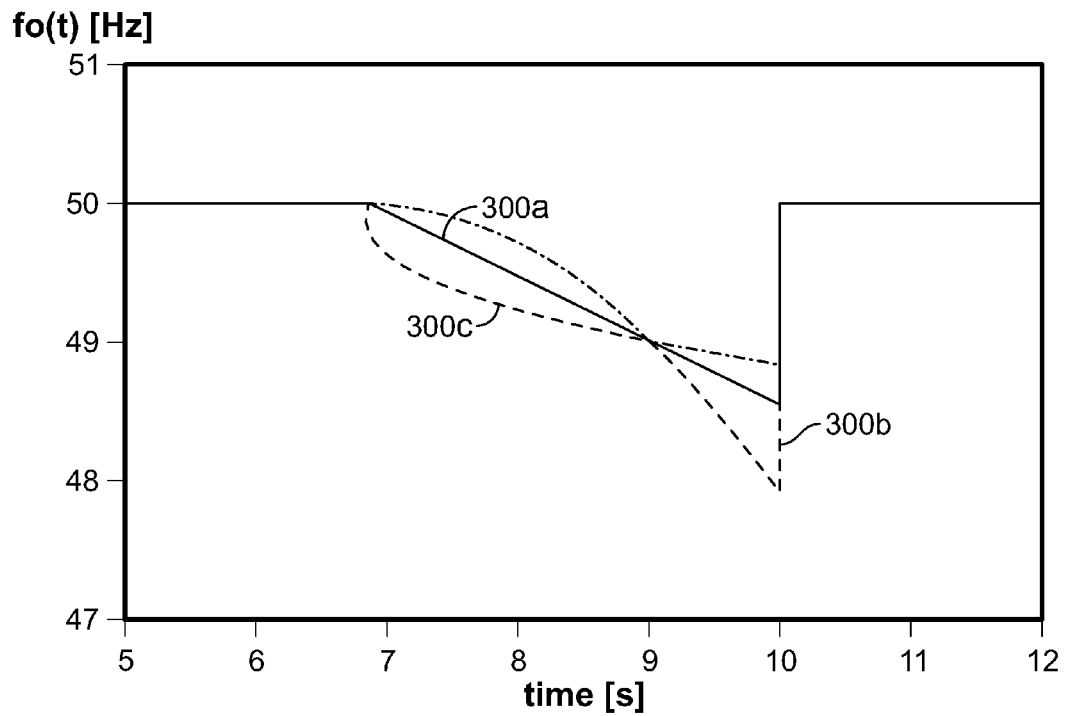
FIG. 3A is a chart showing three distinct predetermined patterns produced by the pattern generator algorithm, which varies the line frequency according to any of the predetermined patterns.

FIG. 3A illustrates the frequency function response with a linear ($\alpha=1$) or exponential response ($\alpha>1$):

$$f_0(t)=f_0-[K_v(t)]^\alpha$$

$$f_0(t)=f_0-[K_i(t)]^\beta \quad \text{(Function 8)}$$

In FIG. 3A, three predetermined patterns 300a-c are shown modifying the AC line frequency as a function of time with different values for the coefficient $\alpha$: for the linear pattern 300a, $\alpha=1$; for the exponential patterns 300b,c, $\alpha=2$, $\alpha=0.4$, respectively. The pattern generator algorithm 124 can vary the AC line frequency or voltage according to a first predetermined pattern (e.g., linear) when the battery voltage or current satisfies a first criterion, and the pattern generator algorithm 124 can vary the AC line frequency or voltage according to a second predetermined pattern (e.g., exponential) when the battery voltage or current satisfies a second criterion. Generally, it is desirable to present a smooth transition away from the nominal frequency when applying the pattern generator algorithm 124 to avoid introducing frequency disturbance and to allow time for the PV inverter 104 to detect the predetermined pattern, such as shown in the predetermined pattern 300b. Exponential patterns like the pattern 300b also work better in a narrow frequency range, such as within the anti-islanding limits of the AC line 138 of the power system 100. The anti-islanding limit can be defined by the Underwriters Laboratory (UL) 1741 or the Institute of Electrical and Electronics Engineers (IEEE) 1547 Standards or other anti-islanding limits imposed by requirements from other countries. For example, the anti-islanding limit can be between 59-61 Hz for a 60 Hz rated frequency on the AC line 138. Preferably, the frequency pattern is varied within +/−0.4 Hz (e.g., or 59.6-60.4 Hz for a 60 Hz rated fundamental frequency or 49.6-50.4 Hz for a 50 Hz rated fundamental frequency). Generally, the frequency pattern should be varied no greater than 2 Hz above and below the fundamental frequency of the AC line 138.

By contrast, the predetermined pattern 300c presents a relatively sudden transition away from the nominal AC line frequency. When there is a sudden increase in a battery overvoltage condition, the pattern generator algorithm 124 can cause the hybrid converter 102 to vary the AC line frequency or voltage according to the predetermined pattern 300c to force the PV inverter 104 to react quickly to the overvoltage and to reduce or eliminate the current or voltage that is charging the battery 106. Generally, if there is a sharp or sudden increase in the rate of change of the battery voltage, it is desirable to change the frequency suddenly so that the PV inverter 104 can react quickly to reduce its power output, and correspondingly reduce the current or voltage supplied to charge the battery 106. For such scenarios, it can be desirable to output the predetermined pattern 300c.

Although linear and exponential patterns are discussed above, any predetermined (e.g., intentional, non-natural, programmed, deliberate) pattern can be used that will not be confused by patterns that could be put onto the AC line by other devices, like generators and loads. The pattern needs to be distinguishable from other patterns created by electrical devices in the power system that cause the frequency or voltage of the AC line to vary. For example, generators vary the frequency/voltage linearly, so care should be taken, if using a linear pattern to vary the AC line frequency or voltage, to avoid using a pattern that would produced by a generator. This might unnecessarily cause the PV inverter 104 to change the battery charging voltage or current when no anomalous battery charging condition exists. Accordingly, it is preferable to use an exponential or linear-exponential pattern.

Figure 3B:
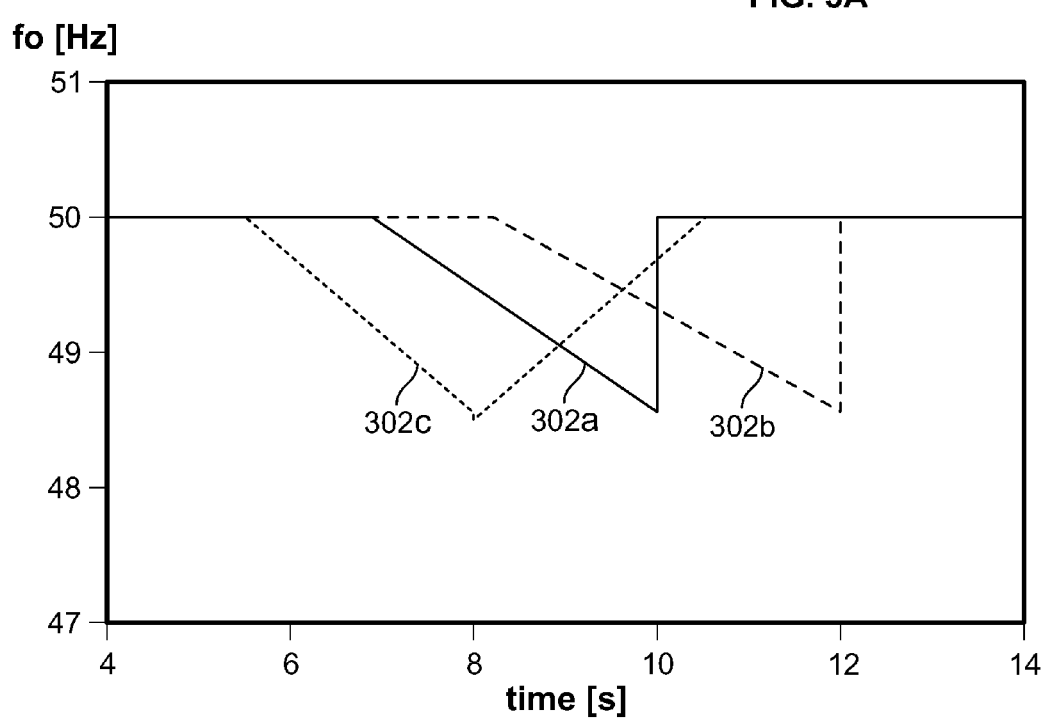
FIG. 3B is a chart of three predetermined patterns corresponding to the rate of change of the AC line frequency response as a function of DC voltage variation of the battery shown in FIG. 1.

FIG. 3B illustrates the rate of change of the AC line frequency response as function of the DC voltage variation of the battery 106. If the voltage/current error is large then the AC line frequency $f_0(t)$ is controlled rapidly. In this example, the frequency is linearly decreased and the rate of change can be a combination between linear-exponential response by having the coefficients $\alpha$ and $\beta$ function of the instantaneous DC voltage and current. The frequency response can be implemented with symmetrical recovery as can be noted in FIG. 3B, which illustrates three predetermined patterns 302a-c each of which is produced by a linear function with the following DC charge voltage/current $d(v_{dc},i_{dc})/dt$ rates: pattern 302a $dv_{dc}/dt=0.3$V/s; pattern 302b $dv_{dc}/dt=0.25$V/s; and pattern 302c $dv_{dc}/dt=0.375$V/s with symmetrical frequency recovery.

Grid-connected DPG modules that convert power to the utility grid 110 are required to be capable of islanding detection. The AC line frequency range where DPG modules are allowed to transfer power is limited and have different requirements: the minimum and maximum frequency range for 50 Hz grid-systems can be 51-48 Hz or for 60 Hz grid-systems can be 60.5-59.3 Hz. The frequency range below its nominal value is larger, and therefore the PV inverters 104 have a wider operation range below 50/60 Hz.

In the islanded mode, the AC line 138 frequency is set by the hybrid converter 102; when the DC voltage or current of the battery 106 is exceeded, the pattern generator algorithm 124 starts to change the line frequency or voltage according to a predetermined pattern, such as linearly or exponentially. When the minimum frequency limit is reached, the PV inverter 104 disconnects from the AC network, interrupting power to the DC port, and the AC line frequency is restored back to the nominal 50/60 Hz value. The hybrid converter 102 transfers the surplus of energy from the AC network to the DC port 132 and battery charging occurs up to the absorption phase while the battery 106 is 80-85% charged as it finishes the bulk charging phase.

Figure 6:
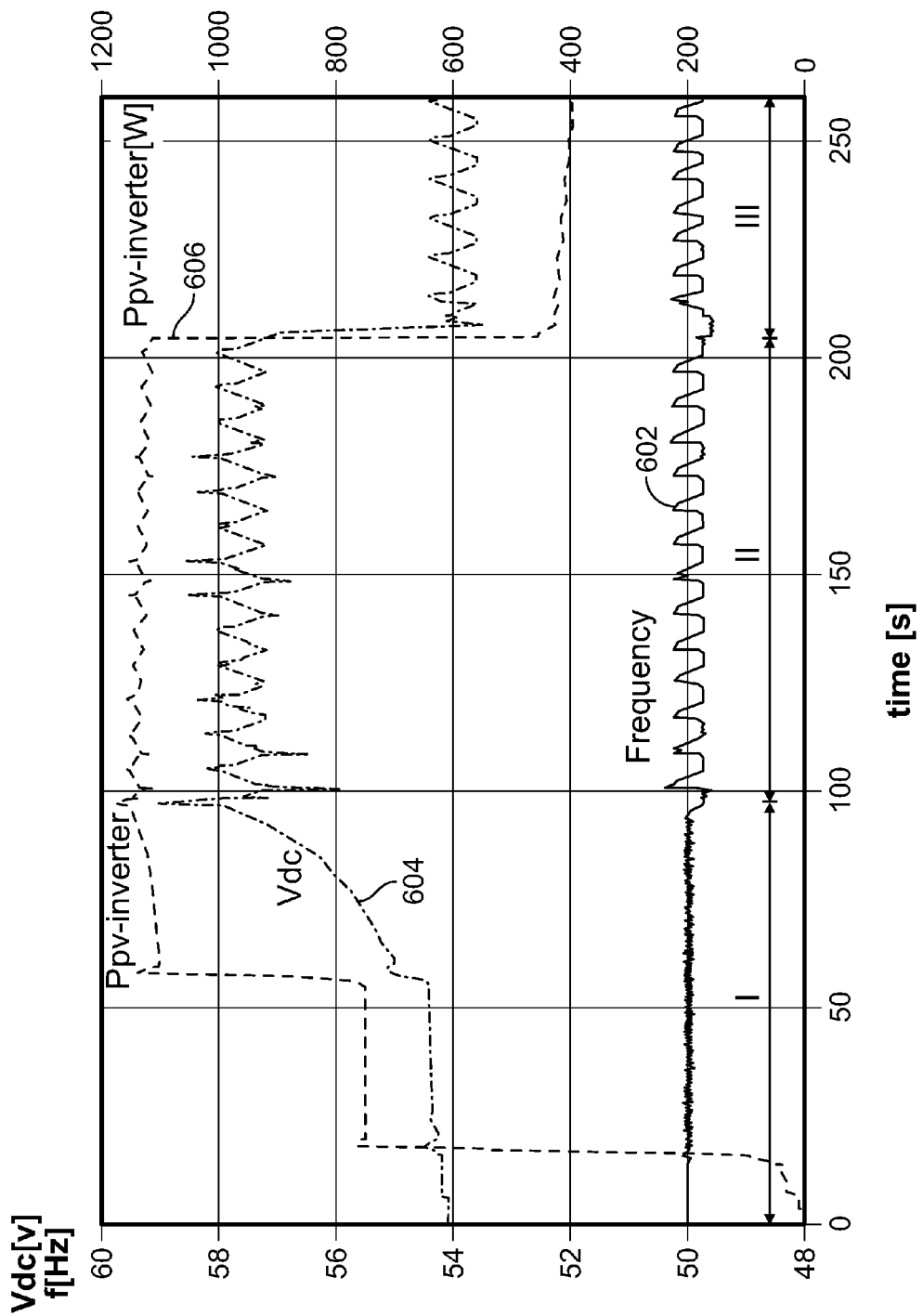
FIG. 6 is a chart illustrating three curves demonstrating the power response of the PV inverter in response to detecting a linear pattern change in the line frequency and the associated DC response of a three-stage charging profile of the battery.

A complete battery charge profile would require the regulation of the DC voltage of the battery for its absorption, float, and charging phases as can be seen in FIG. 6. In this scenario, PV inverters have to access the DC battery voltage information for controlling its local AC current. Communication is required to perform the battery voltage regulation. A redundant mode of operation is proposed herein: the agent of communication is the AC line frequency variation optionally within a range of the anti-islanding limit of the AC line. Alternately, AC voltage pattern variation can be used as agent of communication instead, but is less precise than the frequency because voltage is subject to the wire impedance variation. The pattern detection algorithm in the PV inverter 104 will sense a specific frequency (or voltage) change pattern and adjust its local AC current, exiting from the MPPT mode to AC-coupling mode. Under AC-coupling mode, the hybrid converter 102 alternates the frequency change slope over a determined integrated period to average the AC line frequency to its nominal value of 50/60 Hz.

Figures 4, 5A, 5B:
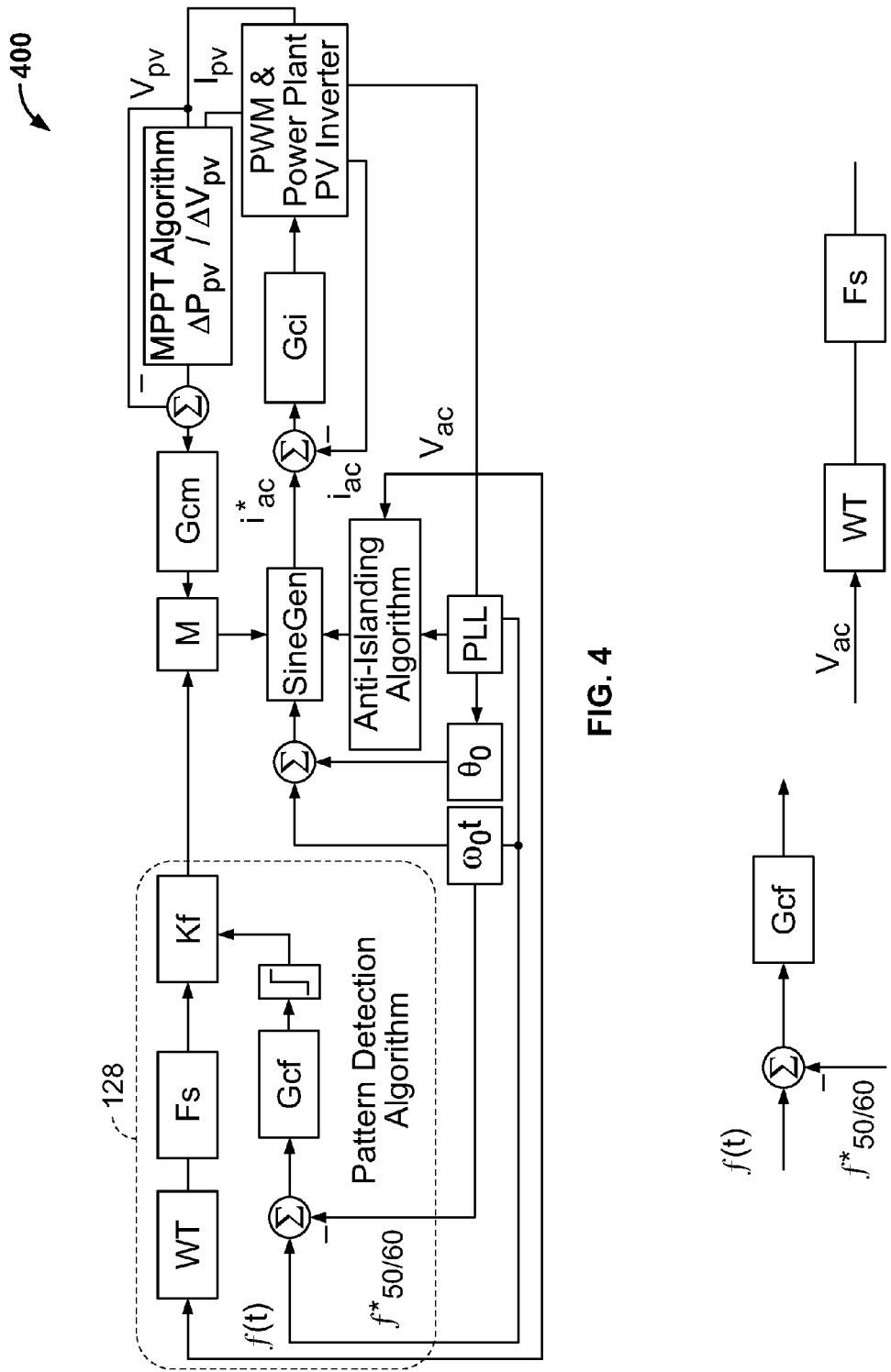
FIG. 4 is a functional block diagram of a control method for the PV inverter including a pattern detection algorithm executed by a controller of the PV inverter shown in FIG. 1.
FIG. 5A is a block diagram of a proportional-integral-derivative (PID) type controller for use in the pattern detection algorithm shown in FIG. 4.
FIG. 5B is a block diagram of a wavelet transform and pattern selection function for use in the pattern detection algorithm shown in FIG. 4 instead of the PID-type controller shown in FIG. 5A.

FIG. 4 illustrates a block diagram of a control method for the PV inverter 104, operating as a current-controlled source. The sinewave current reference $i^*_{ac}$ generated by a LUT (a SineGen look-up table) is synchronized with the grid frequency f(t) and phase $\theta_0$ to achieve a unity power factor.

A specific frequency (or voltage) pattern is generated by the pattern generator algorithm 124 of the hybrid converter 102 and is accurately sensed by the pattern detection algorithm 128 because the PV inverter 104 exits from MPPT mode and regulates its local output function of the frequency (or voltage) pattern variation. If the frequency variation does not follow a specific pattern the selection function M selects the MPPT mode for controlling the AC output current.

Among the control alternatives, Fast Fourier Transform, PID-type control (proportional-integral-derivative control), fuzzy logic, etc, a wavelet method for frequency change detection is preferred. Wavelets transforms have excellent frequency-time localization and tracking for rapid changing signals. The AC line frequency change detection can be realized with a PI frequency controller $G_{cf}$ (FIG. 5A) or more accurately with a wavelet frequency tracking WT and pattern selection function Fs (FIG. 5B). When the specific line frequency pattern is detected, the frequency coefficient $K_f$ controls the output current of the PV inverter 104.

A continuous wavelet transform is applied to the sensed signal from Function 1 above. As a result of this process, the wavelet coefficients C(a, b) are generated, where a is the scale and b the position.

$$C_v(a, b) = \int_{-\infty}^{\infty} v_{ac}(t) \cdot \psi_{ab}(t) dt \quad \text{(Function 9)}$$

where $\Psi_{a,b}(t)$ is the wavelet function which is used as the analysis tool and should detect the frequency change in any time interval.

$$\psi_{ab} = \frac{1}{\sqrt{a}} \psi_{ab}\left(\frac{t-b}{a}\right) \quad \text{(Function 10)}$$

The oscillation of the wavelet gives the frequency content of $v_{ac}(t)$ and the values of the wavelet coefficients will reflect how closely correlated the wavelet is with a particular section of the signal, as given by the position parameter. The pattern detection algorithm 128 makes use of the Morlet wavelet transform in this example:

$$V(a, b) = \frac{1}{\sqrt{a}} \int v_{ac}(t) \cdot e^{-\frac{\left(\frac{t-b}{a}\right)^2}{2}} \cdot e^{j\omega\left(\frac{t-b}{a}\right)} dt \quad \text{(Function 11)}$$

Function 11 measures the similarities between the basis wavelet function and sensed signal $v_{ac}(t)$. The Morlet wavelet basis function is given by:

$$\psi(x) = \frac{1}{\sqrt{\pi \cdot f_b}} e^{2\pi \cdot f_0 \cdot i \cdot x} \cdot e^{\frac{-x^2}{f_b}} \quad \text{(Function 12)}$$

The finite duration of the wavelet and the spectrum of Morlet wavelet is given by:

$$\psi(\omega) = \sqrt{2\pi} \cdot e^{\frac{-(\omega-\omega_0)^2}{2}} \quad \text{(Function 13)}$$

The algorithm for pattern detection using the Morlet wavelet transform is described next. The Morlet wavelet transform (WT) is applied to the signal $v_{ac}(t)$. The output of the Morlet wavelet transform are represented by the coefficients C(a,b).

The purpose is to track fine frequency changes. Low values of parameter a will compress the wavelet for small frequency change detection. Therefore, coefficients corresponding to the scale parameter a of level 1 (a=1) are of interest in this example. For the position parameter b, 100 samples per line cycle is selected in this example.

The local maxima and minima of these coefficients are computed. A polynomial best-fit function of the envelope is searched for, and this function will reflect the variation in time of the original signal frequency. For example, if the frequency has a linear pattern of change, a mathematical function of the linear type can be constructed.

FIG. 6 is a chart 600 illustrating exemplary curves 602, 604, 606 corresponding to the AC line frequency voltage, $V_{ac}$, on the AC line 138 (curve 602), the battery, $V_{dc}$, of the battery 106 monitored by the DC port 132 of the hybrid converter 102 (curve 604), and the power output, $P_{pv-inverter}$, of the PV inverter 104, as a function of time in seconds. When the battery voltage exceeds a predetermined current or voltage resulting in an overcharging condition, the hybrid converter 102, via the pattern generator algorithm 124, begins to reduce the AC line frequency according to a linear function. The PV inverter 104 detects the linear pattern change in the AC line frequency, and reduces its power output onto the AC line 138, causing the battery voltage to drop below the overcharging state. The predetermined current or voltage for the battery can correspond to the battery manufacturer's overcharging battery threshold or can be any predetermined current or voltage (such as, in the illustrated example, approximately 5% or higher above a maximum charging voltage or current). Interval I: represents the bulk charging phase during which the energy is transferred from the PV inverter 104 to the battery bank 106. At the boundary of Interval I and II, the DC voltage level exceeds the lead-acid battery absorption of 57.6V. The pattern generator algorithm 124 of the hybrid converter 102 starts to decrease the line frequency (curve 602), which is monitored by the pattern detection algorithm 128 of the PV inverter 104, which starts to decrease its output power $P_{pv-inverter}$ (curve 606). As a result, the DC battery voltage, $V_{dc}$ (curve 604), ramps down below the threshold of 57.6V. The hybrid converter 102 starts to increase the line frequency (curve 602) back to nominal. As can be seen in FIG. 6, the frequency is varied +/−0.4 Hz within the anti-islanding range and the net average frequency target is 50 Hz with negligible effect on the line frequency. When the absorption charge phase is finished (Interval II) the hybrid converter 102 continues with a float charge phase (Interval III) with an average voltage level of 54V. The PV inverter 104 will be in maximum power point tracking (MPPT) mode with the exception of Interval II and III when the PV inverter 104 specifically detects a predetermined pattern for controlling its output power (curve 606).

Figure 7:
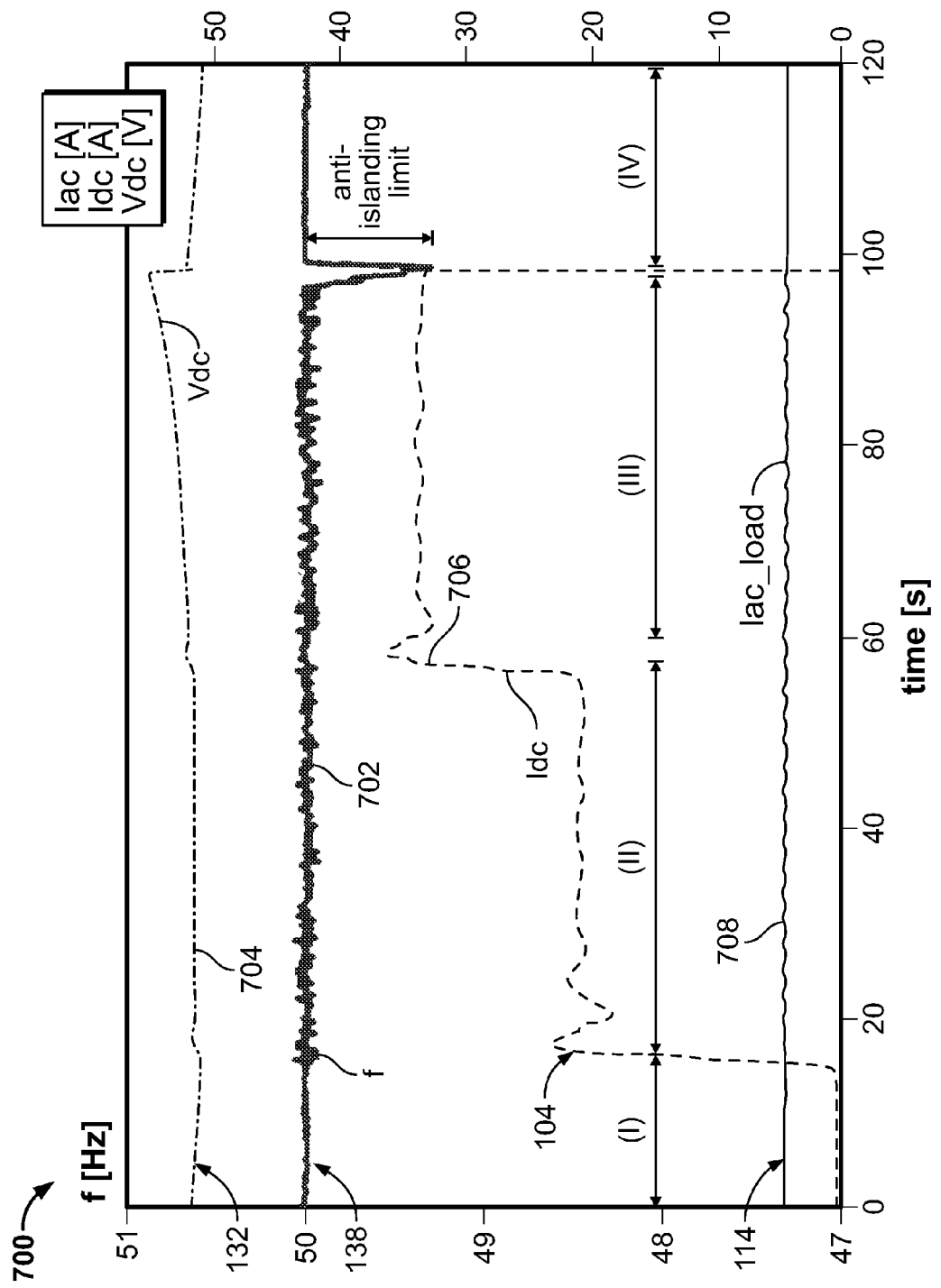
FIG. 7 is a chart illustrating four curves corresponding to the battery voltage, line frequency, PV inverter power output, and AC load current demonstrating the effect of the power output response of the PV inverter in response to detecting a predetermined pattern in the line frequency and the associated DC response of the battery.

FIG. 7 is a chart 700 illustrating exemplary curves 702, 704, 706, 708 corresponding to the AC line frequency, f (curve 702), the battery voltage $V_{dc}$, of the battery 106 monitored by the DC port 132 of the hybrid converter 102 (curve 704), the current output, $I_{dc}$, of the PV inverter 104, and the AC current of the load 114, $I_{ac\_load}$, as a function of time. These curves were generated with a bidirectional 6 kVA Xantrex converter module (XW6048) 102, with its AC port 130a configured at 230V/50 Hz and its DC port 132 40-65V connected to a 225 Ah lead-acid battery 106. The control functions 122, 124, 126, 128 are implemented as a 32-bit TMS320F2812 DSP running at 150 MHz.

In FIG. 7, the effect of the pattern generator algorithm 124 causes the hybrid converter 102 to linearly change the AC line frequency with a rate of change equal with 0.4 Hz/s. Results are shown with the power system 100 in off-grid islanded mode with Intervals I-IV as described next. Interval I: the PV inverter 104 is off and the AC line frequency, f, is 50 Hz +/−0.01. Interval II: the PV inverter 104 turns on and the hybrid converter 102 charges the battery 106 with 20 Adc. Interval III: the battery 106 is still in bulk phase mode and more energy is harvested from the PV array 112. Notice on both Intervals II and III, the AC line frequency is disturbed but with negligible effect (maximum ±0.1 Hz) by the PV inverter 104 anti-islanding algorithm. At the end of Interval III the PV inverter 104 is not able to detect the frequency pattern change and continues to transmit power to the battery 106. As a result the DC voltage (curve 704) continues to rise above the acceptable limit and the frequency is further decreased beyond the anti-islanding limit of the PV inverter 104. Interval IV: because the frequency limit is exceeded in the previous interval, the DC battery voltage steps down ($V_{dc}$, 10V/div) to the resting battery voltage, thereby avoiding overcharging the battery 106. A conventional PV inverter not equipped with the pattern detection algorithm 128 can operate within Interval IV when anti-islanding limits are exceeded, protecting the battery 106 from overcharging. However, such a conventional PV inverter cannot protect the battery 106 from overcharging when the frequency is within anti-islanding limits.

It should be noted that the algorithms 124, 128 illustrated and discussed herein can have various modules that perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Any of the algorithms disclosed herein include machine readable instructions for execution by: (a) a microprocessor, (b) a microcontroller, and/or (c) any other suitable processing device. It will be readily understood that the controllers 122, 128 referenced herein each includes such a suitable processing device. Any algorithm, such as the algorithms 122, 128, disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts or functional block diagrams depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of automatically controlling a current or voltage applied to a battery by monitoring a characteristic of an alternating current (AC) line, comprising:

determining, in a first module, whether a monitored current or voltage of the battery satisfies a predetermined criterion;

responsive to the current or voltage of the battery satisfying the criterion, automatically changing via the first module the characteristic of the AC line using a pattern generator algorithm that produces a modified output that varies the characteristic of the AC line according to a first predetermined pattern that is produced by a first function, wherein the first module includes a first controller programmed with machine-readable instructions for carrying out the generator pattern algorithm and is electrically coupled to the battery and to at least one source of AC energy; and detecting, at a second module remote from the first module via a pattern detection algorithm, the modified output, and, responsive to the detecting, causing the current or voltage applied to the battery for charging the battery to be changed via the first module, wherein the second module includes a second controller programmed with machine-readable instructions for carrying out the pattern detection algorithm and is electrically coupled to the first module.

2. The method of claim 1, wherein the characteristic is a frequency or a voltage of the AC line.

3. The method of claim 1, wherein the criterion is whether the current or voltage of the battery exceeds a predetermined current or voltage.

4. The method of claim 1, wherein the criterion is whether the current or voltage of the battery falls below a predetermined current or voltage.

5. The method of claim 1, wherein the first module includes a hybrid converter for providing and receiving energy.

6. The method of claim 1, wherein the second module is coupled to a renewable energy conversion unit that converts a source of renewable energy into electricity.

7. The method of claim 1, wherein the second module includes a photovoltaic inverter that receives solar energy from a photovoltaic array coupled to the second module and outputs a corresponding AC current.

8. The method of claim 1, wherein the characteristic is varied within an anti-islanding limit of the AC line, wherein the AC line is rated to oscillate at a fundamental frequency, and wherein the anti-islanding limit does not exceed 2 Hz above or below the fundamental frequency.

9. The method of claim 8, wherein the anti-islanding limit is within a defined anti-islanding limit in the Underwriters Laboratory (UL) 1741 or the Institute of Electrical and Electronics Engineers (IEEE) 1547.

10. The method of claim 1, wherein the first function includes an exponential function.

11. The method of claim 1, wherein the first function includes a linear function.

12. The method of claim 1, wherein the first function includes a linear-exponential function.

13. The method of claim 1, wherein the characteristic of the AC line is varied first according to the first predetermined pattern and second according to a second predetermined pattern that is produced by a second function that differs from the first function.

14. The method of claim 1, wherein the pattern detection algorithm includes a wavelet transform function, a PID, fuzzy logic, or a Fast Fourier Transform.

15. The method of claim 1, wherein the source of AC energy is a utility grid or a distributed generator system (genset).

16. The method of claim 2, wherein the criterion is whether the current or voltage of the battery falls outside of a predetermined range of current or voltage, wherein the first module includes a hybrid converter that provides and receives energy, wherein the second module is coupled to a renewable energy conversion unit that converts a source of renewable energy into electricity, wherein the second module includes a photovoltaic inverter or converter that receives solar energy from a photovoltaic array coupled to the second module and outputs a corresponding current, and wherein the first function includes an exponential function, a linear function, or a linear-exponential function.

17. The method of claim 16, wherein the source of AC energy is a utility grid or a distributed generator system (genset).

18. The method of claim 17, wherein the characteristic is varied within an anti-islanding limit of the AC line, wherein the AC line oscillates at a fundamental frequency, and wherein the anti-islanding limit does not exceed one hertz above or below the fundamental frequency.

19. The method of claim 18, wherein the pattern detection algorithm includes a wavelet transform function.

* * * * *